(12) United States Patent
Zikeli et al.

(10) Patent No.: US 11,073,177 B2
(45) Date of Patent: Jul. 27, 2021

(54) ROTATIONAL SLIDING BEARING (71) Applicant: AUROTEC GMBH, Regau (AT)

(72) Inventors: Stefan Zikeli, Regau (AT); Ernst Rauch, Vöcklabruck (AT)

(73) Assignee: AUROTEC GMBH, Regau (AT)

( * ) Notice: Subject to any disclaimer, the term of this patent is extended or adjusted under 35 U.S.C. 154(b) by 567 days.

(21) Appl. No.: 16/071,848

(22) PCT Filed: Jan. 20, 2017

(86) PCT No.: PCT/EP2017/051129
§ 371 (c)(1),
(2) Date: Jul. 20, 2018

(87) PCT Pub. No.: WO2017/125520
PCT Pub. Date: Jul. 27, 2017

(65) Prior Publication Data
US 2021/0172471 A1 Jun. 10, 2021

(30) Foreign Application Priority Data
Jan. 20, 2016 (EP) ..................................... 16152114

(51) Int. Cl.
*B63B 3/12* (2006.01)
*F16C 17/02* (2006.01)
(Continued)

(52) U.S. Cl.
CPC .............. *F16C 17/02* (2013.01); *A63B 55/60* (2015.10); *B62B 3/02* (2013.01); *B62B 3/12* (2013.01);
(Continued)

(58) Field of Classification Search
CPC .............. A63B 55/60; B62B 3/02; B62B 3/12
See application file for complete search history.

(56) References Cited

U.S. PATENT DOCUMENTS

| 2,761,691 A | 9/1956 | George |
| 5,141,385 A | 8/1992 | Tibbatts et al. |

(Continued)

FOREIGN PATENT DOCUMENTS

| DE | 8632416 U1 | 2/1987 |
| EP | 0303558 B1 | 3/1992 |

(Continued)

OTHER PUBLICATIONS

International Search Report from International Patent Application No. PCT/EP2017/051129, dated Mar. 2, 2017.
(Continued)

*Primary Examiner* — John D Walters
*Assistant Examiner* — James J Triggs
(74) *Attorney, Agent, or Firm* — Greer, Burns & Crain, Ltd.

(57) ABSTRACT

A rotational sliding bearing having a static part and a mobile part, each having a sub-shell with a sliding surface, each surface arranged within an angular range of max. 180° relative to the rotational axis in the direction of rotation of the bearing, and in a closed rest position, the sub-shells of all parts together form a bearing bush, the mobile part is arranged to pivot about a pivot axis for opening the bearing relative to the static part, such that a shaft mounted in the bearing is released in a release position, and the mobile part is shaped such that, based on the sliding surface position relative to the rotational axis, in the closed rest position, a translation of a shaft accommodated in the bearing is prevented transversely to the rotational axis and in the direction of the pivot axis of the mobile part or in the counter direction.

15 Claims, 5 Drawing Sheets

(51) Int. Cl.
*B62B 3/02* (2006.01)
*F16C 33/04* (2006.01)
*A63B 55/60* (2015.01)
*B62B 3/12* (2006.01)

(52) U.S. Cl.
CPC ...... *F16C 33/046* (2013.01); *B62B 2202/404* (2013.01)

(56) References Cited

U.S. PATENT DOCUMENTS

| | | | |
|---|---|---|---|
| 5,188,381 A | 2/1993 | Kho | |
| 6,308,442 B1 | 10/2001 | Naka et al. | |
| 6,336,785 B1 | 1/2002 | Kunzman | |
| 6,481,124 B1 | 11/2002 | Miller et al. | |
| 7,584,972 B2 | 9/2009 | Myers et al. | |
| 8,632,416 B2* | 1/2014 | Finn | A63B 53/047 473/291 |
| 9,555,822 B2* | 1/2017 | Rauch | B62B 3/022 |
| 2002/0125667 A1* | 9/2002 | Sciulli | B62B 1/12 280/47.26 |
| 2007/0180509 A1* | 8/2007 | Swartz | G06F 9/4406 726/9 |
| 2014/0332299 A1* | 11/2014 | Rauch | B62B 3/027 180/208 |

FOREIGN PATENT DOCUMENTS

| | | |
|---|---|---|
| EP | 2300243 B1 | 6/2012 |
| GB | 2155118 A | 9/1985 |
| JP | H06-299820 A | 10/1994 |

OTHER PUBLICATIONS

Written Opinion of the International Searching Authority from International Patent Application No. PCT/EP2017/051129, dated Mar. 2, 2017.

European Search Report from European Patent Application No. 16152114.1, dated Jun. 29, 2016.

Japanese Office Action from corresponding Japanese Patent Application No. 2018-537823, dated Aug. 19, 2019.

* cited by examiner

ROTATIONAL SLIDING BEARING

BACKGROUND

The invention relates to a rotational sliding bearing for the releasable bearing of a shaft, especially of a gear wheel shaft or fixation spindle of a transport vehicle, such as a bicycle, scooter, golf trolley or wheelchair.

Such rotational sliding bearings used for the temporary accommodation of shafts or shaft stubs are known in the state of the art. In general, such a bearing prevents two freedoms and/or degrees of freedom of a translation in the radial direction of its circular cross-section, i.e. in transverse directions to the axis of rotation. For this reason, it is also referred to as a radial bearing or in this special case as a radial sliding bearing.

GB 2155118 B describes the bearing of a shaft of the cutting rotor of a lawn mower. Here, a separable claw coupling is provided which is arranged detachably at the cutting rotor, so that a part of the claw coupling can be removed and the shaft can be drawn from the rotor in the axial direction. Changing the rotor shaft is thus comparatively difficult, labour-intensive and time-consuming.

EP 0303558 B1 describes a rotational sliding bearing for axes and platens in office machines, wherein a removable bearing body is mounted in a self-locking manner in a surface structure of the office machines. In order to be able to remove the shaft from the bearing, the bearing body itself has to be removed and has to be pulled from the shaft along the rotational axis.

For bearing and fastening of shaft ends, EP 2 300 243 B1 describes the axial fixation of a shaft stud on the face side in a bearing housing and/or a bearing bush, wherein the shaft end is passed into a specially formed sliding bearing bushing and the elastically deformable prongs attached to the sliding bearing bushing latch into the collar fitted to the shaft end, and thus secure the shaft from axial displacement.

Moreover, the state of the art knows bolt receivers and bolt retainers which are not intended and suitable for pivot bearing of shafts.

DE 86 32 416.0 U1 describes a snap-action bearing for accommodating a round profile, wherein the bearing contour on one side forms a tapered insertion opening. The dimension of the insertion opening is thus somewhat smaller than the diameter of the bearing and smaller than the round profile to be embedded. Thus, the snap-action bearing is widened or deformed so much in the area of a tongue that the round profile to be held can snap in. The tongue of the snap-action bearing can widen or expand unintentionally, whereby the profile to be secured is released from the snap-action bearing. In order to prevent this happening, an additional safety bracket has been provided at the side of the snap-action bearing. A round profile inserted in the bearing contour can be secured by means of the safety bracket in the snap-action bearing. Due to the necessary deformability of the bearing, this snap-action bearing is not suitable as a rotational sliding bearing.

Moreover, couplings are known for the attachment of tools, such as loading shovels, excavator shovels on prime movers or tractor units.

Such couplings are known, for example, from WO 00/14342 A1, DE 69 028 453 T2, U.S. Pat. No. 6,308,442 B1 or EP 0 952 013 A1. The solutions mentioned in the documents have in common that naturally no rotational sliding bearing is described in each of them, and that the bolt receivers shown for coupling are not suitable as rotational sliding bearing either. On the contrary, an accessory equipment is attached as rigidly as possible to the coupling or the respective drive unit which, generally speaking, is achieved by the attachment of several radially offset bolts. The shape of the fixtures shown and the attachment by means of diverse safety catches is frequently unsuitable for this reason for the rotatable bearing of shafts, but aims at a stable fixture of the bolts placed.

U.S. Pat. No. 2,761,691 A discloses a golf trolley having two wheels whose axis is pivot-mounted in an L-ledge and is retained with pivoting brackets. The brackets have a sliding surface which is concentric to the pivot axis.

U.S. Pat. No. 5,188,381 A illustrates a holding arrangement for a suitcase for mounting an axle for wheels. The axle is pivot-mounted in an insert of the holding arrangement and is fixed with a second insert of a pivotable lever. The pivot axis of the lever is positioned on a central line of the insert of the holding arrangement.

WO 2007/063330 A2 relates to a golf bag having wheels which are pivot-mounted on an axle. The axle is mounted by means of a pivotable clip in a channel-shaped recess in the bottom of the golf bag.

US 2014/332299 A1 illustrates a golf trolley having a carriage holding three wheels on at least two axles, one axle being a drive axle and the other axle being formed by a freely pivot-mounted shaft. A mobile bearing part is not illustrated here.

In the device according to US 2002/125667 A1 an axle is accommodated and mounted in C-shaped clips. A mobile bearing part is not illustrated here, either.

It is an object of the present invention to propose a rotational sliding bearing of the type initially mentioned, from which a shaft accommodated can be released quickly and easily.

SUMMARY

In order to solve this object a rotational sliding bearing having a static bearing part and a mobile bearing part is suggested, each having a sub-shell with a sliding surface, wherein the sliding surfaces of the bearing parts are each arranged within an angular range of max. 180° relative to the rotational axis in the direction of rotation of the rotational sliding bearing (wherein the angular range of the sliding surface of the static bearing part differs at least partially from the angular range of the sliding surface of the mobile bearing part), and in a closed rest position of the rotational sliding bearing the sub-shells of all bearing parts together form a bearing bush (wherein said bearing bush may be at least partially formed as an integral bearing) of the rotational sliding bearing, wherein the mobile bearing part is arranged such that it can pivot relative to the static bearing part about a pivot axis for opening the rotational sliding bearing, such that a shaft mounted in the rotational sliding bearing is released in an open release position thereof, and wherein the mobile bearing part is shaped such that, based on the position of the sliding surface thereof relative to the rotational axis, a translation of a shaft accommodated in the rotational sliding bearing is prevented in a transverse direction to the rotational axis and in the direction of the pivot axis of the mobile bearing part or in the opposite direction.

The sliding surfaces of the bearing parts are not necessarily continuous, i.e. they could be formed by several sliding surface sections each. Correspondingly, the respective bearing part (static or mobile) itself need not consist of one piece, but can be set up by stringing together several bearing part sections and thus several partial bearing surfaces. In addition, the sliding surfaces can have an arbitrary structure in general, i.e. they could either be flat sliding surfaces or sliding surface sections. Moreover, the width, i.e. the dimension parallel to the rotational axis of the rotational sliding bearing of the mobile bearing part and of the static bearing part, may be different. The pivot axis of the mobile bearing part is preferably oriented parallel to the rotational axis of the rotational sliding bearing so that the transverse forces on the mobile bearing part are minimised. The closed rest position (in which the sub-shells of all bearing parts jointly form a bearing bush of the rotational sliding bearing) corresponds to the position assumed by the rotational sliding bearing also in operation with a shaft mounted therein. The rest position may therefore also be referred to as operating position.

For an especially stable and safe accommodation and bearing of a shaft, it is advantageous if the static bearing part has a stop which in the open release position of the rotational sliding bearing limits the translation of a shaft accommodated in the rotational sliding bearing in a transverse direction to the rotational axis and out of the sub-shell of the static bearing part (especially wherein the shaft is removed from the sliding surface(s) of the sub-shell of the static bearing part). Preferably, the stop and the sub-shell of the static bearing part may jointly block the removal of an accommodated shaft by an only linear translation in a transverse direction to the rotational axis from the static bearing part. Due to the stop it is thus not possible to guide the shaft in one direction out of the sub-shell of the static bearing part and completely out of the static bearing. On the contrary, a sequence of movements is forced with movements in different directions in order to move the shaft past the stop and to remove it from the bearing. This has the advantage that an unintentional release of the shaft alone will not cause a removal from the bearing because the correct sequence of movements has to be carried out in addition.

To avoid unnecessary complications during intentional removal of the shaft, it is favourable if the static bearing part forms a guideway which has an opening for the insertion of a shaft into the static bearing part, and which ends in the sub-shell of the static bearing part, wherein the guideway has a spiral structure at least in sections. In this connection, spiral refers to a spiraly wound or curved structure originating from the sub-shell of the static bearing part. Geometrically, such a structure corresponds to a circular-arc-shaped structure with an increasing radius. The spiral structure ensures a guideway along a arc section such that the sequence of movements to be carried out is defined by the guideway. In such an arrangement, the mobile bearing part can be displaced from the rest position when inserting a shaft in the static bearing part, such that no additional actuation is required to open the bearing. In this process, the displacement is achieved by the structure of the guideway which is in sections substantially parallel to the pivoting direction of the mobile bearing part. This means that the shaft moved on in the guideway causes pivoting of the mobile bearing part.

In addition, it has proved to be particularly favourable if the mobile bearing part, from the closed rest position of the rotational sliding bearing, can be pivoted only in the direction of the open release position of the rotational sliding bearing. This means that pivoting in the opposite direction is blocked by a suitable stop, for example. Such a limitation of the movement of the mobile bearing part has the advantage that the circular cross-section of the bearing does not fall below an inside diameter defined in the rest position, especially not under the effect of a resetting force mentioned hereinafter. In this way a local pressure of the mobile bearing part on the mounted shaft and thus an associated increase of friction or even jamming of the shaft is prevented.

Moreover, it is advantageous if the sliding surfaces of the static and mobile bearing parts in the rest position have a continuous circular-arc-shaped structure relative to the rotational axis of the rotational sliding bearing. In particular, the sliding surfaces may correspond each to the shell surface of a cylinder segment, the axis of which is the rotational axis of the rotational sliding bearing. The advantage of such sliding surfaces is the generally larger contact surface between the bearing and the shaft compared to other designs, whereby the friction on the rotational sliding bearing is reduced.

It is particularly advantageous if the sliding surface of the static bearing part has a semicircular structure relative to the rotational axis of the rotational sliding bearing. Given the pre-set bearing diameter and bearing width, this design can achieve the maximum contact surface which leads to a minimization of friction.

It has proved to be advantageous if the mobile bearing part can be pivoted from the rest position against the reset force of a resetting element, especially a return spring. Especially, a transition of the mobile bearing part from the rest position to the release position requires an overcoming of the reset force of the resetting element. The resetting element may also be a hydraulic resetting element, in particular, such as a hydraulic brake cylinder, a pneumatic resetting element, such as a gas spring, or an electric resetting element, such as an electric brake system or an electric linear drive. Due to the resulting resetting effect, the mobile bearing part remains in the closed rest position independently of the orientation of the bearing. Moreover, in this way a safe and reproducible click shut (or snap shut) of the shaft can be achieved in the bearing.

In this connection it is especially favourable if the mobile bearing part is formed at the end of a two-armed lever. Thus, due to the leverage effect achievable against the reset force of the resetting element, a resetting element with a comparatively high reset force can be used without aggravating the operation of the bearing.

In connection with such a guideway it is advantageous if the diameter of the guideway increases towards the opening. This facilitates the insertion of a shaft and avoids jamming or wedging of the shaft in the guideway.

An especially preferred application of the present invention is a device, especially a chassis with at least two rotational sliding bearings of the type defined hereinbefore, wherein at least two rotational sliding bearings have a joint rotational axis. Such a device can be used in an easily and quickly collapsible chassis, for example, if the two bearings are fitted to take up a wheel shaft.

In such a device or such a vehicle chassis it has proved to be especially favourable if the mobile bearing part of the at least two rotational sliding bearings is formed at an end of a two-armed lever each, wherein the ends of the levers opposite the mobile bearing parts are connected with a joint actuation bracket, especially in the form of a transverse bolt parallel to the rotational axis. In such a way, a quick release of a mounted shaft can be achieved by simple operation of all pivot bearings (i.e. at the same time).

Moreover, the static bearing part of the at least two rotational sliding bearings each forms a guideway which has an opening for the insertion of a shaft into the static bearing part and which ends in the sub-shell of the static bearing part, wherein the openings of the guideway of the at least two rotational sliding bearings are arranged at a bottom side of the device. Especially when used with gear wheel shafts, the bottom side is that side at which the wheels touch the ground during operation. This means it is a side opposite a structure, e.g. for the transport of objects. In this arrangement of the openings, a displacement of the mobile bearing parts during the insertion of a shaft, e.g. also against the reset force of a resetting element, is advantageously supported by the gravity and the weight of the device.

The bearing parts and/or the sliding surfaces formed may consist of different materials and/or material combinations, which are matched preferably to the bearing and the bearing lubrication. The following materials or material combinations are considered the preferred options: metals, polymers and synthetic materials, carbon-fibre reinforced plastics, sintered metals and ceramic materials.

A preferred application of rotational sliding bearings used for the releasable mounting of a shaft is that in a chassis of a golf trolley, wherein the chassis holds at least three wheels at a minimum of two axles, of which one axle forms a freely pivoted shaft, wherein the shaft is mounted detachably at the chassis by two snap-action bearings. This applies in particular for golf trolleys for the mainly upright transport of a golf bag. In this case, it is beneficial if the shaft, for adequate lateral stabilization of the golf trolley, has a corresponding minimum length despite the relatively high centre of gravity in the loaded condition. In order not to limit the transport capacity of the golf trolley due to its lateral dimensions, it is beneficial if the golf trolley can be disassembled in an especially simple manner, quickly and with a few effortless movements, i.e. disconnecting especially the relatively long axle from the chassis. Thus, the application of the releasable rotational sliding bearing is preferred especially in transport equipment in conformity with WO 2013/052977 A1, wherein the rotational sliding bearings can be employed preferentially in keeping with the variants described hereinbefore with the advantages described.

BRIEF DESCRIPTION OF THE DRAWINGS

The invention is described further hereinafter by means of especially preferred embodiments, to which it should not be restricted, however, and with reference to the drawings. In this respect, the following is shown.

DETAILED DESCRIPTION

Figures 1, 2:
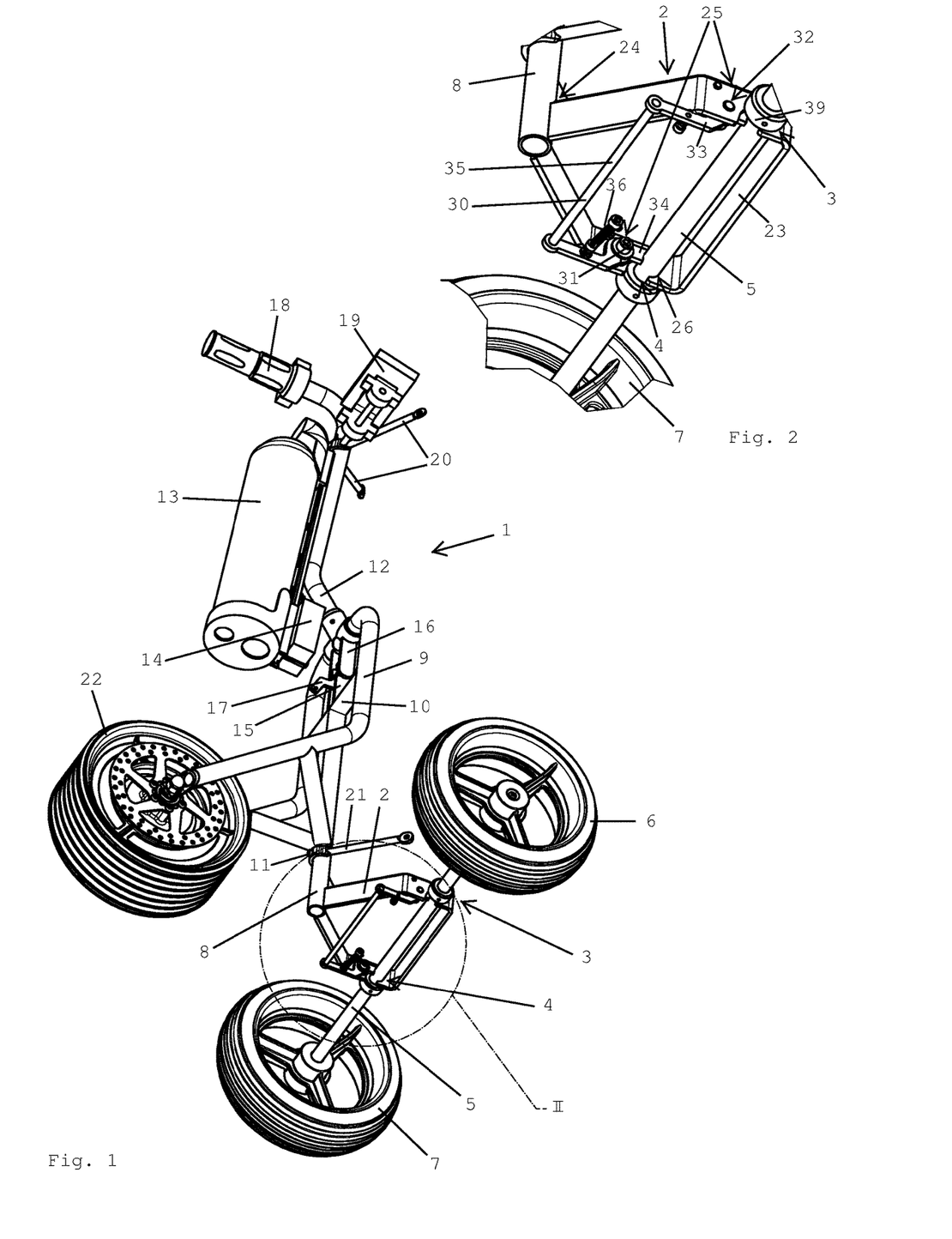
FIG. 1 shows a view of a golf trolley with a rear axle mounted in a rotational sliding bearing according to the invention.
FIG. 2 shows a larger view of detail II in accordance with FIG. 1.

FIGS. 1 and 2 show a transport vehicle in the form of a golf trolley 1 with a bearing box 2 which comprises two rotational sliding bearings 3, 4 in accordance with the invention. A shaft 5, which forms a rear axle of the golf trolley 1, is mounted in the rotational sliding bearings 3, 4. The rear wheels 6, 7 are pivot-mounted relative to the bearing box 2. In particular, the rear wheels 6, 7 are connected to the shaft 5, and the shaft 5 is pivot-mounted in the rotational sliding bearings 3, 4 of the bearing box 2. The rear wheels 6, 7 are linked to the shaft 5 preferably by means of an installed quick release mechanism which permits the quick disassembly of the rear wheels 6, 7 from the shaft 5, contributing to the efficient disassembly and compacting of the transport vehicle. The upper side of the bearing box 2 forms a standing space used to set down the goods to be transported, such as a golf bag (cf. FIG. 6). On the front side, the bearing box 2 is connected with a guide bar 8 which in turn is linked to a frame support 9 by means of a cross-brace 10. The guide bar 8 may be pivot-mounted or may have a swivel joint in the lower section in which the bearing box 2 is mounted. For the purpose of rotating or pivoting of the bearing box 2 relative to the frame support 9, a tube motor may be fitted in the guide rod 8. Needless to say that other rotary drives manually or electrically driven, with or without gearbox design, can be used so that the gearbox 2 can be pivoted with the coupled shaft 5 of the rear wheels 6, 7, and thus a change of direction of the shaft 5 and of the rear wheels 6, 7 is started.

In the case of an electric control of the rotary drive, this can be ensured by the battery 13 fitted to the upper steering part 12 and the controller 14. The control of a tube motor and the drive system can be carried out by radio with integrated radio receiver and radio transmitter. The control by global positioning system (GPS) including the integration in a navigation satellite system for position determination of the transport device can be used in the transport device as well. Another possibility of controlling the rotary drive can be ensured by data transmission between the individual devices by wireless technology over a short distance; in this respect connectionless as well as connection-based signal transmissions from point to point and ad hoc or pico nets are conceivable by radio Bluetooth technology installed with appertaining application software programs (apps). For example, the controller 14 can communicate with a tube motor by a Bluetooth interface. The main purpose of the use of radio technology is the replacement of cable connections between the devices and component units of the transport device so that there is no risk of damaging any cable connections when folding together.

The upper steering part 12 is pivot-mounted at the frame support 9 and can be folded to the rear or front when the transport device is folded together. The lower part 15 of a locking and holding mechanism is attached to the cross member 10. The upper part 16 of the locking and holding mechanism is fitted to the upper steering part 12, and when unfolding the transport device in an end position in conformity with FIG. 1 combines with the lower part 15 of the locking and holding mechanism in such a way that a spring-loaded locking lever 17 which is attached to the lower part 15 of the locking and holding mechanism is deflected by a transverse bolt 43 (cf. FIG. 7) of the upper part of the locking and holding mechanism, and subsequently is locked in and thus joins in a force-fitting manner the steering part 12 with the frame support 9.

The battery 13 and the controller 14 fitted to the upper steering part 12 may be attached individually or jointly to the steering part 12 or may be fitted individually or jointly in a box, which in turn is or are attached to the steering part 12. Another construction of the steering part 12 may include that the steering part 12 is used simultaneously as a box container for battery and controller. For commissioning or for decommissioning of the transport device, a potentiometer can be provided at the upper steering part 12 as an adjustable electric resistance element. By the mechanical rotation or displacement of an operating element, the resistance values can be changed, thus adapting the travelling speed, or causing commissioning or decommissioning. Twist-grip controls 18 can be used as well. The transport device can also be controlled by digital control inputs so that a change of speed and/or travelling direction is achieved.

At the upper end of the steering part 12, a control display 19 may be mounted to display the travelling speed, the battery voltage and, where appropriate, other information derived from the driving mode. Moreover, the steering part 12 is also used as a carrier for a support and holding unit 20 for goods to be transported. In addition, a similar support and holding unit 21 is attached to the guide rod 8 for holding and securing the goods to be transported. If a steerable version of the shaft 5 and of the rear wheels 6, 7 is chosen, the installation and attachment of the lower supporting and holding unit 21 has to be chosen in such a way that the rotatable bearing box 2 can be freely moved and rotated below the goods transported so that a change of direction can be initiated.

The transport device is driven by the front wheel 22 fitted to the frame support 9. The front wheel 22 is preferably driven electromechanically, for instance, by means of a direct current or an alternating current motor with or without gear, especially a wheel hub motor. The drive can be ensured by the battery 13 and the controller 14 as well as by a potentiometer or the rotary handle 18, and the driving speed can be regulated. Transport devices without electromechanical drives are conceivable.

Figure 3:
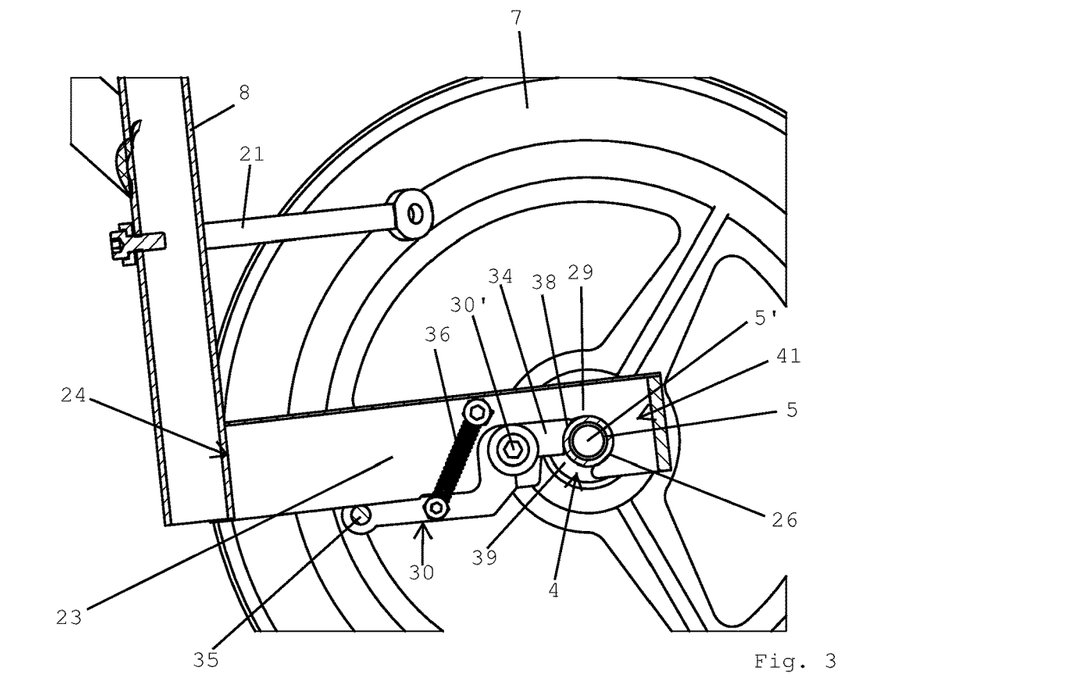
FIG. 3 shows a sectional view of the bearing box of the golf trolley in conformity with FIG. 1 in a rest position with the rear axle fixed in the rotational sliding bearing.

FIG. 2 shows the bearing box 2 from the bottom in detail. An essential criterion of the transport device in conformity with FIG. 1 is the disassembling ability and compactness of the structural elements. Thus, the bearing box 2 is advantageously designed in such a way that a circumferential frame 23 is formed which is connected via a fixed linkage 24 with the guide rod 8. The circumferential frame 23 fulfils several functions. For holding and bearing the shaft 5 for the rear wheels 6, 7, the lateral outer sides 25 of the frame 23 are intended for a cut-out with a shape or contour which forms a sub-shell 26 of a rotational sliding bearing 3 and/or 4 for holding the shaft 5. The shaft 5 is slidingly mounted at a sliding surface 26' of the sub-shell 26. The recess (cf. FIG. 4) forms a guideway 27 which has an opening 28 permitting the insertion of the shaft 5 (cf. FIG. 3). The guideway 27 ends in a sub-shell 26 of the static bearing part 29 thus formed in the frame 23. Substantially the guideway 27 has a stop 29' opposite the sub-shell 26 of the static bearing part 29. Preferably the guideway 27 has a curved or spiral-shaped structure at least in sections starting from the opening 28 up to the sub-shell 26 of the static bearing part 29. As an alternative, the structure of the guideway 27 may be angled at least at one point. The circular part of the contour of the static bearing part 29 shaped by the recess, which forms the sub-shell 26, has approximately the diameter of the shaft 5 to be accommodated therein, and has a length which corresponds to about half of the circumference of the shaft 5 to be accommodated. After the circular section, the contour passes into a predominantly regularly opening or extending part up to the opening 28 in the frame 23, so that the diameter of the opening 28 is about ten to twenty percent larger than the diameter of the shaft 5.

The wall thickness of the frame 23 in the area of the static bearing part 29 is chosen in such a way that sufficient sliding and bearing surface is available for the bearing of the shaft 5. The frame slide bearing width depends on the diameter of the shaft 5 in order that an ideal bearing capacity is achieved. The bearing width ratio is between 0.14 and 2.86, preferably between 0.20 and 1.00, especially between 0.31 and 0.63. The bearing width ratio is calculated as the sum of the wall thicknesses ("width") of the static and of the mobile bearing parts (see hereinafter), divided by the shaft diameter. For example, at a width of the static bearing part of 5 mm, a width of the mobile bearing part of 5 mm and a shaft diameter of 16 mm, the bearing width ratio of (5 mm+5 mm)/16 mm=0.63 (dimensionless) is rendered as a result.

The bearing diameter (and/or the shaft diameter correspondingly also) is matched to the intended application of the rotational sliding bearing, so that the circumferential speed is between 0.2 and 12 m/s, preferentially between 0.5 and 2.3 m/s, especially between 1.1 and 1.7 m/s. At an intended transport speed of 4 km/h, for example, a shaft diameter of 16 mm is especially suitable, with which a circumferential speed of 1.11 m/s is achieved.

At the external sides 25 of the frame 23, a moving bracket 30 is pivot-mounted about a pivot axis 30'. The bracket 30 can be connected to the sides 25 of the frame 23 by means of screw connections 31. In the area of the screw connections 31, the bracket 30 has an opening with a somewhat larger diameter as compared to the screw connection 31 in order to permit a turn or displacement of the bracket 30. Alternatively, the bracket 30 can be attached to the screw connection 31 by means of a self-locking threaded nut, wherein the screw itself can turn in the corresponding opening 32 in the frame 23.

Figure 5:
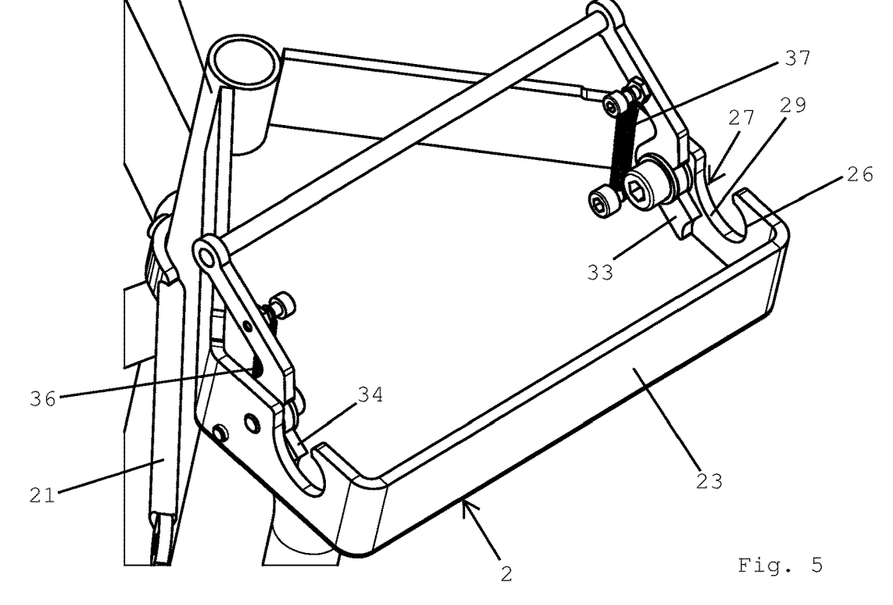
FIG. 5 shows a view of the bearing box of the golf trolley in conformity with FIG. 1 from the bottom in an open release position in conformity with FIG. 4.

The pivot-mounted bracket 30 includes at least two mobile bearing parts 33, 34 which are linked with one another by means of a transverse bolt 35. The mobile bearing parts 33, 34 carry out together and simultaneously a rotation or pivoting about the pivot axis 30' defined by the screw connections 31 when the bracket 30 is actuated. The mobile bearing parts 33, 34 are attached to the frame 23 additionally by means of the resetting elements 36, 37 (cf. FIG. 5) in the form of return springs, wherein the resetting elements 36, 37 are arranged to hold the bracket 30 in a closed rest position 41 of the rotational sliding bearing 3, 4 in keeping with FIG. 3. The resetting elements 36, 37 can be formed by several tensioning elements, such as mechanical springs, shock absorbers, pneumatic or hydraulic springs. In the rest position, the transverse bolt 35 fits closely to the lower edge of the frame 23 so that further pivoting of the bracket 30 in the direction of the frame 23 is blocked. In this position, the mobile bearing parts 33, 34 cover the spirally contour of the static bearing parts 29 so that the sub-shells 26 of the static bearing parts 29 and the sub-shells 38 formed at one end of the mobile bearing parts 33, 34 together make up an almost complete circumferential, circular bearing shell. The shaft 5 is slidingly pivot-mounted between the sliding surface 26' of the sub-shell 26 of the static bearing part 29 and the sliding surface 38' of the sub-shell 38 about a rotational axis 5' defined by the rotational sliding bearing 4 (cf. FIG. 3).

If the bearing box 2 is pressed onto the shaft 5 with the mounted rear wheels 6, 7 from the top with the circulating frame 23 and the bracket 30 in its rest position, the mobile bearing parts 33, 34 are pushed back up, i.e. in the direction of the frame 23, until the shaft 5 passes through the opening 28 and is guided into the sub-shells 26 of the static bearing parts 29 by the guideway 27, and finally locks into the bearing box 2, i.e. the bracket snaps back into the rest position 41 due to the reset force of the resetting elements 36, 37.

The mobile bearing parts 33, 34 pivot-mounted in the frame 23 close the rotational sliding bearings 3, 4 formed together with the respective static bearing parts 29 so that the circumference of the shaft 5 is embraced or enclosed by at least 180 degrees of the sub-shells 26, 38, preferentially in the range between 180 and 270 degrees. The interior surfaces of the sub-shells 38 of the mobile bearing parts 33, 34 cover approx. one third to two thirds of the circumference of the shaft 5, and at the same time form the sliding surfaces 26', 38' of the rotational sliding bearings 3, 4 for the rotating shaft 5.

In order to stop the shaft 5 from moving axially, limitation sleeves 39 are attached to the shaft 5, which rotate as sliding surfaces on the frame 23 which serves as a limitation and support stop against axial displacement. Due to another measure, such as circumferential indentations of the shaft 5, an axial displacement can be prevented as well.

Figure 4:
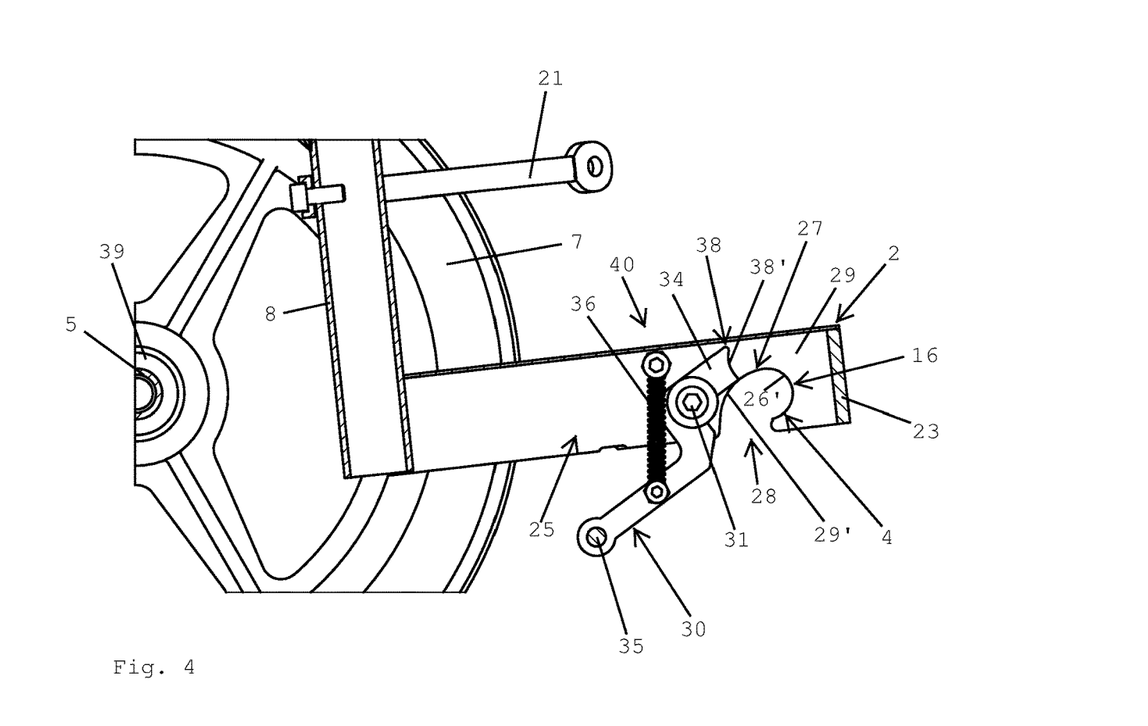
FIG. 4 shows a sectional view in conformity with FIG. 3 in an open release position of the rotational sliding bearing.

In order to decouple and release the shaft 5 the transverse bolt 35 of the bracket 30 is moved down, i.e. away from the bearing box 2, wherein the force exerted has to be so big that the reset force of the resetting elements 36, 37 is overcome and the bracket 30 is pressed into an end position or release position 40 (cf. FIG. 4). In this release position 40, the sub-shells 38 of the mobile bearing parts 33, 34 move back from the shaft 5 completely so that a lock of the shaft 5 in the sub-shells 26 of the static bearing parts 29 no longer exists, and the shaft 5 with the rear wheels 6, 7 fitted slides along the guideway 27 out of the static bearing part 26 by means of gravitational force.

By lifting the bearing box 2 by using the steering part 12 in the release position 4, it can be achieved vice versa that the shaft 5 is ejected from the static bearing parts 29. After release, the bracket 30 is brought back to the initial position, i.e. to the rest position 41, by means of the resetting elements 36, 37. If the shaft 5 is to be recoupled, the process mentioned hereinbefore has to be restarted anew. In order to assist the coupling of the shaft 5, suitable magnets can be fitted optionally at the bearing box 2, the frame 23 and the shaft 5, or the respective parts can be made from ferromagnetic materials, so that the shaft 5 is pulled into the static bearing parts 29 by means of the magnetic force.

Figure 6:
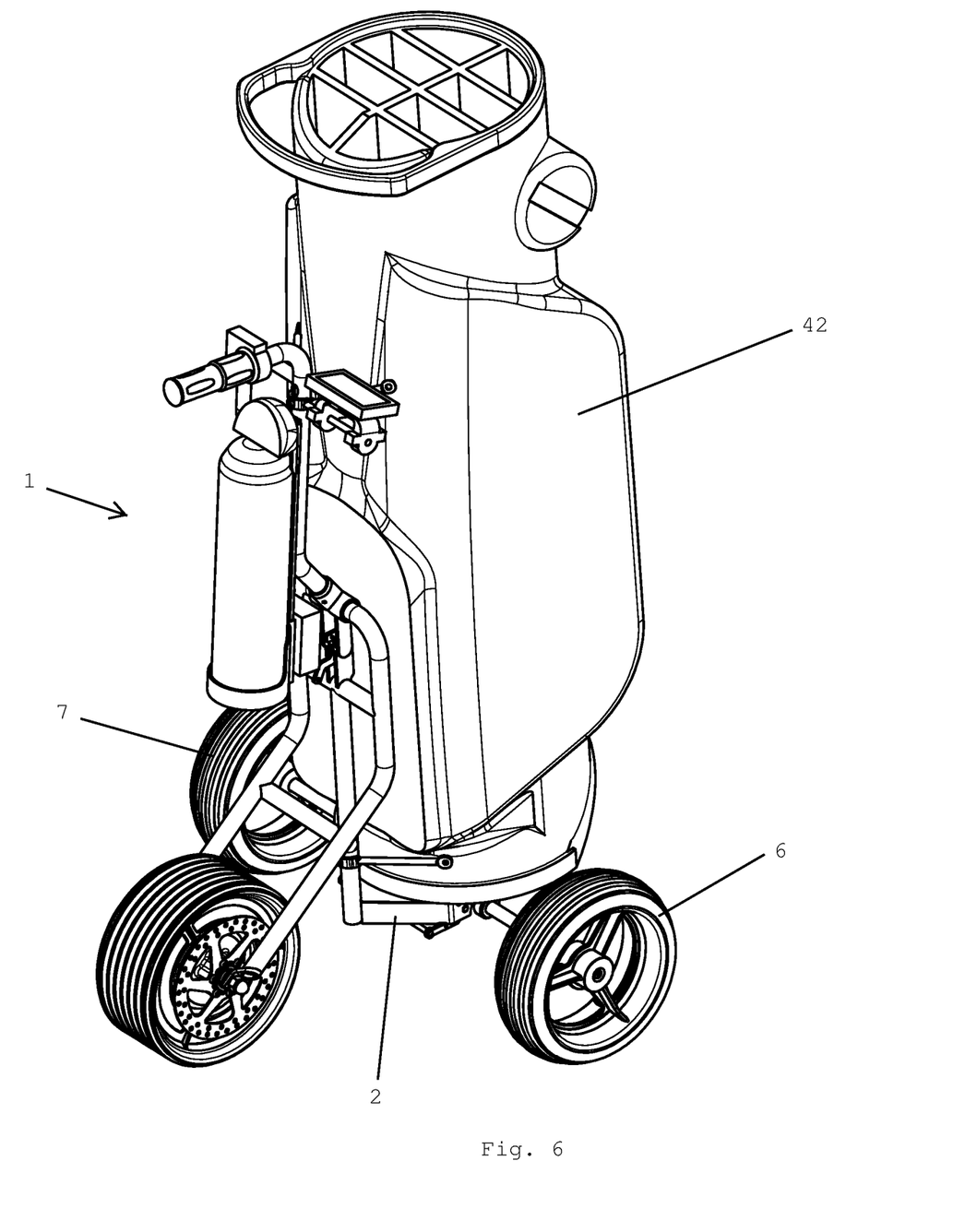
FIG. 6 shows a view of the golf trolley in conformity with FIG. 1 loaded with a golf bag.

FIG. 6 shows a golf trolley 1 in conformity with FIG. 1 loaded with a golf bag 42. For transporting the golf bag 42 it is placed on the standing space or the bearing box 2 in an open position of the golf trolley 1, which at the same time forms the hold and connection of the rear wheels 6, 7.

Figure 7:
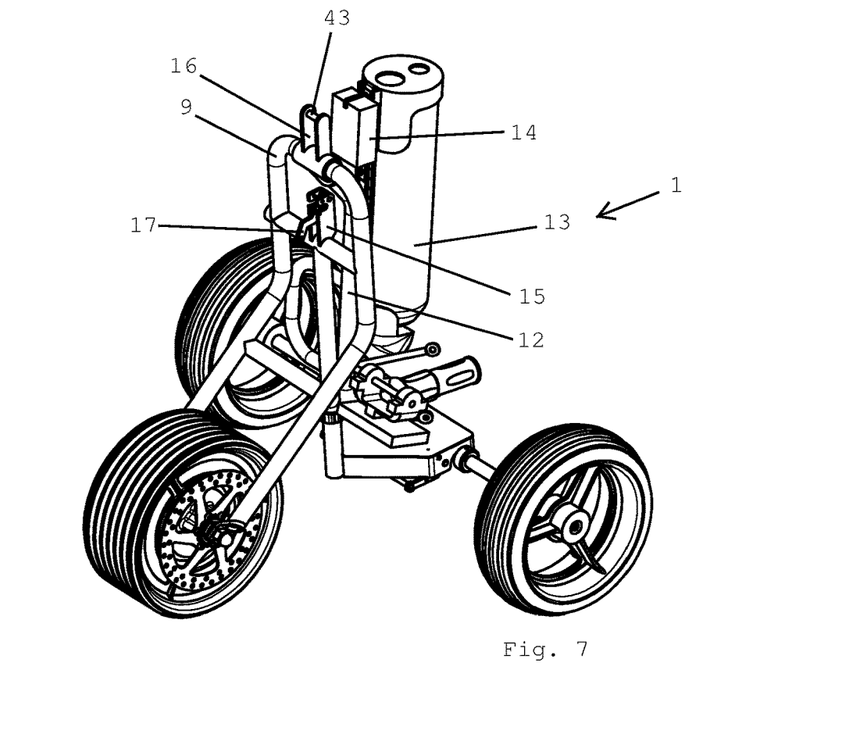
FIG. 7 shows a view of the golf trolley in conformity with FIG. 1 in folded-up position.

FIG. 7 displays the golf trolley in conformity with FIGS. 1 and 6 in a folded condition, i.e. with the steering part 12 folded to the back in the direction of the bearing box 2. In order to pass into this position, the locking lever 17 of the lower part 15 of the locking and holding mechanism was actuated, and thus lifted from the transverse bolt 43 of the upper part 16 of the locking and holding mechanism so that the steering part 12 pivot-mounted on the frame support 9 was released and could be pivoted to the rear into the position shown in FIG. 7.

Figure 8:
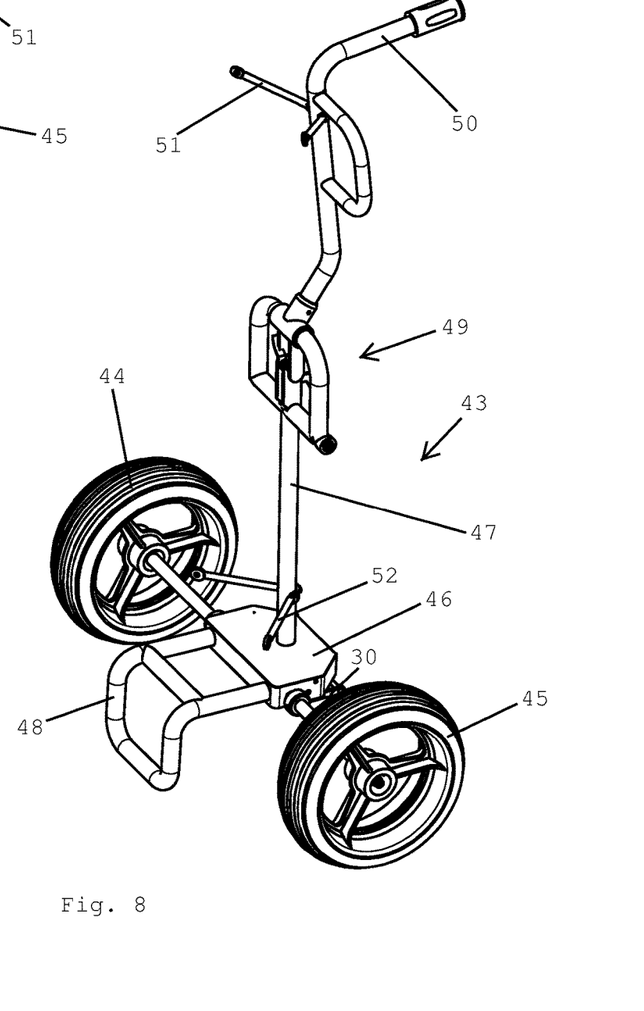
FIG. 8 shows a view of a simple golf trolley with an axle mounted in a rotational sliding bearing according to the invention.
Figure 9:
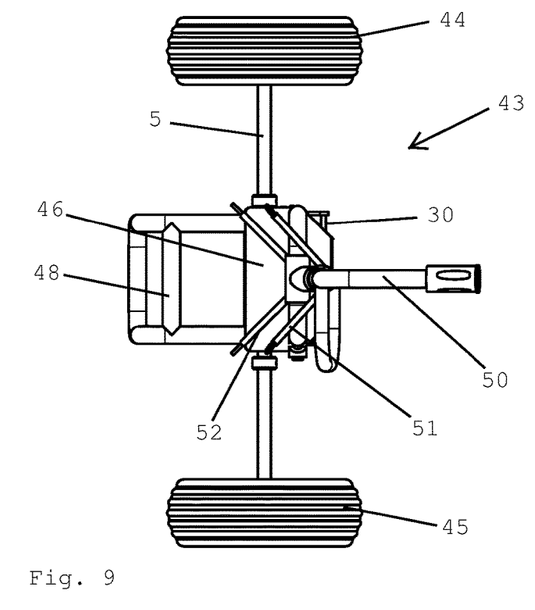
FIG. 9 shows a top view of the golf trolley in conformity with FIG. 8.

FIGS. 8 and 9 show a simpler variant of a golf trolley 43. With regard to the coupling of the shaft 5 of the wheels 44, 45 with the bearing box 2 in conformity with the examples hereinbefore, this comprises essentially an identical bearing box 46. A guide rod 47 is firmly attached to the bearing box. Instead of the frame support with a front wheel, the bearing box 46 is also connected with a resting device 48 by which the golf trolley 43 is supported in an upright position. The resting device 48 on the upper side provides a space for a golf bag (not shown) at the same time. At the front side of the bearing box 46 opposite the resting device 48 a bracket 30 for the release of the rotational sliding bearing 3, 4 is visible, wherein with respect to the functional details of the bracket 30 and its pivoting to prevent repetitions, reference is made to the previous examples in FIGS. 1 to 5. The guide rod 47 is used to link a lockable hinged connector 49 with a steering part 50, wherein the steering part 50 as well as the guide rod 47 are provided with supporting units 51, 52 to support a golf bag transported.

The invention claimed is:

1. A rotational sliding bearing comprising: a static bearing part and a mobile bearing part, each having a sub-shell with a sliding surface, wherein the sliding surfaces of the bearing parts are each arranged within an angular range of max 180° relative to the rotational axis in the direction of rotation of the rotational sliding bearing, and in a closed rest position of the rotational sliding bearing, the sub-shells of all bearing parts together form a bearing bush of the rotational sliding bearing;
   the mobile bearing part is arranged such that it can pivot relative to the static bearing part about a pivot axis for opening the rotational sliding bearing, such that a shaft mounted in the rotational sliding bearing is released in an open release position thereof;
   the mobile bearing part is shaped such that, based on the position of the sliding surface thereof relative to the rotational axis, in the closed rest position, a translation of a shaft accommodated in the rotational sliding bearing is prevented in a transverse direction to the rotational axis and in the direction of the pivot axis of the mobile bearing part or in the opposite direction; and
   the static bearing part has a stop which, in the open release position of the rotational sliding bearing, limits a straight-line translation of a shaft accommodated in the rotational sliding bearing in a transverse direction to the rotational axis and out of the sub-shell of the static bearing part.

2. The rotational sliding bearing according to claim 1, characterized in that the static bearing part forms a guideway which has an opening for the insertion of a shaft into the static bearing part, and which ends in the sub-shell of the static bearing part, wherein the guideway has a spiral structure at least in sections.

3. The rotational sliding bearing according to claim 1, characterized in that the mobile bearing part, from the closed rest position of the rotational sliding bearing, can be pivoted only in the direction of the open release position of the rotational sliding bearing.

4. The rotational sliding bearing according to claim 1, characterized in that the sliding surfaces of the static and mobile bearing parts in the rest position have a continuous circular-arc-shaped structure relative to the rotational axis of the rotational sliding bearing.

5. The rotational sliding bearing according to claim 4, characterized in that the sliding surface of the static bearing part has a semi-circular structure relative to the rotational axis of the rotational sliding bearing.

6. The rotational sliding bearing according to claim 1, characterized in that the mobile bearing part can be pivoted from the rest position against the reset force of a resetting element.

7. The rotational sliding bearing according to claim 6, characterized in that the resetting element is a return spring.

8. The rotational sliding bearing according to claim 7, characterized in that the mobile bearing part is formed at an end of a two-arm lever.

9. The rotational sliding bearing according to claim 8, characterized in that the diameter of the guideway increases towards the opening, preferably increases by 10 to 20 percent.

10. A device having at least two rotational sliding bearings according to claim 1, wherein said at least two rotational sliding bearings have a joint rotational axis.

11. The device according to claim 10, characterized in that the mobile bearing part of said at least two rotational sliding bearings is formed at an end of a two-arm lever each, wherein the ends of the lever opposite the mobile bearing parts are connected with a joint actuation bracket, especially in the form of a transverse bolt parallel to the rotational axis.

12. The device according to claim 10, characterized in that the static bearing part of said at least two rotational sliding bearings each forms a guideway which has an opening for the insertion of a shaft into the static bearing part, and which ends in the sub-shell of the static bearing part, wherein the openings of the guideways of said at least two rotational sliding bearings are arranged at a bottom side of the device.

13. The use of the device according to claim 10 to accommodate and remove a shaft with two wheels of a golf trolley.

14. The use according to claim 13, characterized in that the golf trolley has an additional driven wheel.

15. A golf trolley, comprising: a chassis which supports at least three wheels at a minimum of two axles, one axle of which is formed by a freely pivot-mounted shaft; the shaft is held removably at the chassis by two snap-action bearings; and the chassis is a device according to claim 10, wherein the two rotational sliding bearings form the snap-action bearings to hold the freely pivot-mounted shaft.

* * * * *